Patented Mar. 12, 1929.

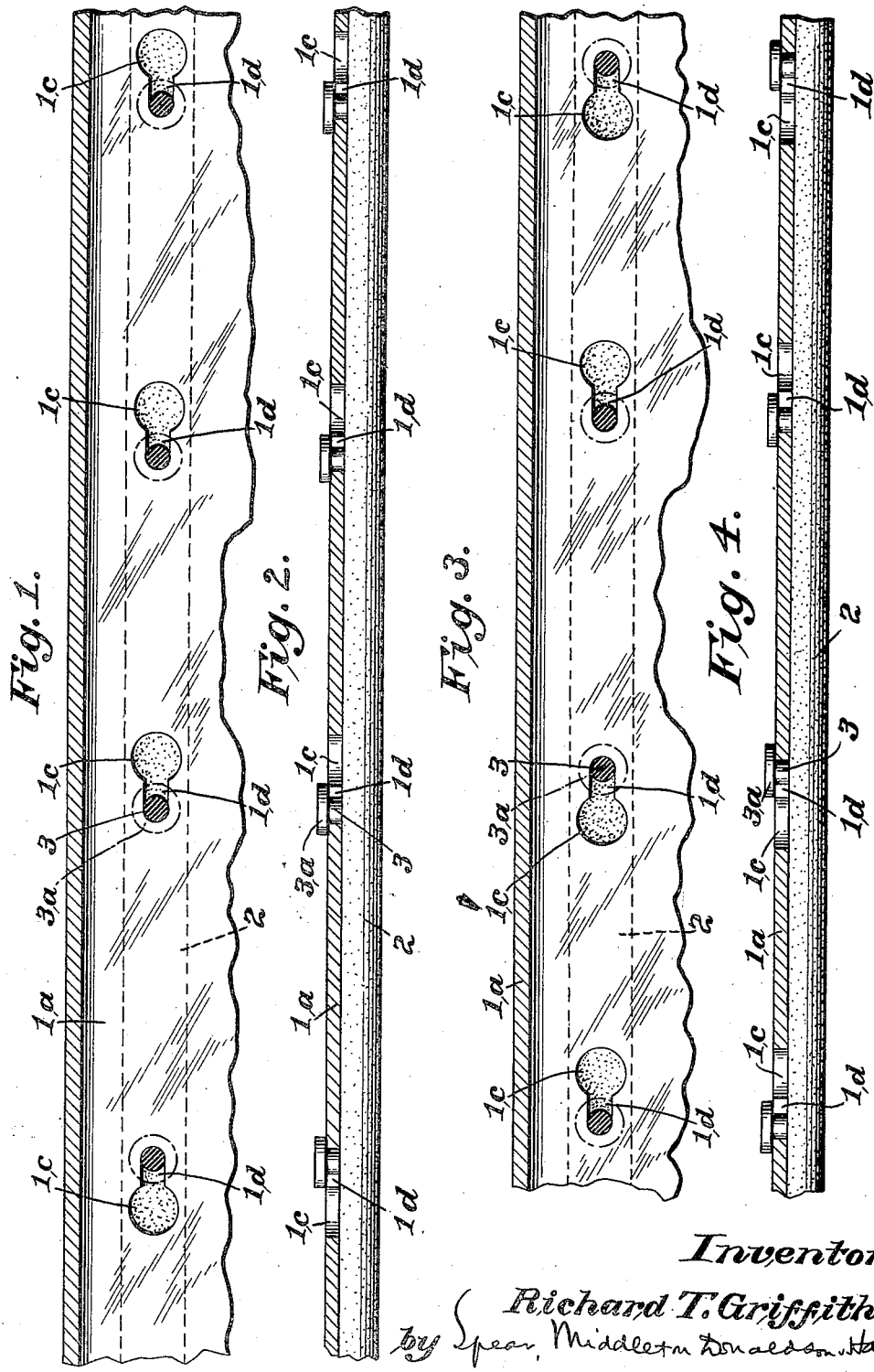

1,705,454

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

GASKET AND METHOD OF ATTACHING SAME.

Application filed August 25, 1927. Serial No. 215,438.

My said invention relates to a method of and means for forming and affixing rubber packing strips or gaskets to metal surfaces and is particularly adapted for providing steel doors of refrigerators and the like with such packing means.

Packing gaskets or strips of sponge rubber have been found to be a specially efficient form of packing, but great difficulty has been experienced in securing such strips to the metal surfaces, and many attempts have been made to avoid such difficulties without success heretofore, so far as I am aware.

The present invention aims to provide improved means by which such attachment may be readily and economically effected and the union will be permanent so that the strip will not be liable to be accidentally detached.

The invention further aims to provide an improved method of manufacturing such packing strips, and securing them to the metal surfaces.

With such objects in view the invention includes the novel structure and method hereinafter described and defined by the appended claims.

In order that the invention may be more readily understood, reference is made to the accompanying drawing in which:—

Fig. 1 is a face view of a metal gasket carrying member with the heads of the attaching studs shown by dot and dash lines to illustrate their relation to the key hole slots.

Fig. 2 is a sectional view of the member or plate with the gasket and attaching means shown in elevation.

Figs. 3 and 4 are similar views showing a modification.

Referring by reference characters to this drawing, the numeral $1^a$ designates the sheet metal member to which the gasket is to be applied, such as the offset flange portion of a refrigerator door which have lateral extensions $1^d$ forming with the holes $1^c$ key hole shaped openings. This is provided with a plurality of holes, $1^c$, spaced apart distances according to circumstances as found most desirable. 2 designates the packing strip or gasket, preferably of sponge rubber and most desirably made of semi-cylindrical shape in cross section.

At distances apart corresponding substantially to the spacing of the aforesaid holes, the flat face of the gasket is provided with attaching devices, each comprising a shank 3 and an enlarged head $3^a$, which shanks and heads may conveniently be made of solid rubber.

The heads $3^a$ are of such size as to pass through the openings $1^c$ and the shanks 3 are designed to enter the reduced portions $1^d$.

The successive holes $1^c$, $1^c$ are reversely placed and the extremities of the slots $1^d$ are positioned a distance apart corresponding to the spacing of the shanks of the attaching means on the gasket strip. In applying such a gasket, I insert one of the attaching members through the enlarged portion $1^c$ of the opening and move it laterally until the shank enters the recess $1^d$. Then by stretching the gasket strip the heads of the attaching members may be alined with the portions $1^c$ of other openings and inserted therein and when tension on the gasket strip is released the shanks will be drawn into and held in the slots or recesses $1^d$ by the elasticity of the strip.

It is not necessary that the attaching means should have much if any elasticity, and they could be made of harder rubber, or other material suitably connected to the gasket strip.

In the modification illustrated in Figs. 3 and 4 embodying what I may term the keyhole type of slot of Fig. 1 the narrow portions $1^d$ are reversed on every other hole.

The spacing of the studs may be uniform and the slots unequally spaced, the rubber strip being compressed in order to enter the first two buttons and stretch for the next two, etc.

What I claim is:

1. The herein described method of attaching rubber gaskets to a sheet metal carrying plate which consists in providing such plate with a plurality of holes having reduced extensions and such strip with a plurality of projections having heads of a size to pass through said openings and shanks to fit said extensions, the distance between certain of the holes exceeding the distance between the corresponding projections, stretching the strip to aline the heads of the projections with the holes, entering the projections in the holes, and releasing the strip to allow the shanks to enter the hole extensions.

2. In combination a carrying member of rigid sheet material having reversely placed key hole slots therein, and a stretchable rubber article having headed attaching means adapted to enter the round portions of said openings and shanks corresponding in diameter to the hole extensions, the distance between said headed extensions being less than the distance between the round portions of the said openings.

In testimony whereof, I affix my signature.

RICHARD T. GRIFFITHS.